United States Patent [19]

You

[11] Patent Number: 5,785,076
[45] Date of Patent: Jul. 28, 1998

[54] INFLATING ASSEMBLY FOR TIRE

[76] Inventor: Bae-Jou You, No. 63, Alley 90, Lane 1, Sec 6, Lu Ho Road, Ho Mei Cheng, Chang Hua Hsien, Taiwan

[21] Appl. No.: 650,867
[22] Filed: May 20, 1996
[51] Int. Cl.⁶ .................................................. F16K 15/20
[52] U.S. Cl. ........................ 137/231; 137/223; 137/876; 251/351
[58] Field of Search ........................ 137/223, 231, 137/876; 251/351

[56] References Cited

U.S. PATENT DOCUMENTS

| 308,161 | 11/1884 | Howard et al. | 137/876 |
| 1,465,952 | 8/1923 | Smith et al. | 251/351 X |
| 1,797,383 | 3/1931 | Wahl et al. | 137/231 |
| 1,854,797 | 4/1932 | Kirkpatrick | 137/231 |
| 2,062,638 | 12/1936 | Campbell | 137/223 X |
| 2,344,492 | 3/1944 | Brubaker | 137/223 |
| 2,716,998 | 9/1955 | Knasko | 137/231 |
| 2,869,573 | 1/1959 | Stafford | 137/223 |
| 2,949,244 | 8/1960 | Philppe | 137/231 X |
| 3,142,328 | 7/1964 | Iknayan et al. | 137/231 X |
| 3,948,481 | 4/1976 | Pollock | 251/351 |
| 4,807,847 | 2/1989 | Martz | 251/351 X |

Primary Examiner—John Rivell
Attorney, Agent, or Firm—Birch, Stewart, Kolasch & Birch, LLP

[57] ABSTRACT

An inflating assembly comprises a L-Shaped body. The L-shaped body has a tubular threaded portion at front and side ends. The L-shape body has a tubular portion at the front end and is provided with an inflating device. The L-shape body has a side tubular portion mounted with a blowing device. Internal channel is disposed for connecting with a compressor through the hose. The inflating assembly can conduct an inflating and blowing operations.

2 Claims, 5 Drawing Sheets

INFLATING ASSEMBLY FOR TIRE

FIELD OF THE INVENTION

This invention relates to an inflating assembly, more particularly, to an inflating assembly that combines the functions of inflating and adjusting tire pressure as well as blowing out the dust.

DESCRIPTION OF RELATED ART

As described in FIG. 10, the conventional inflating assembly used for tires generally includes 1) a valve, 2) a pressure gauge, 3) a connecting hose; and 4) a nozzle. Said valve 1 is provided with an inlet port 101 which is connected to a pressure source, such as a compressor, via a connecting hose. An actuating lever 102 is used to press against one end of the piston 103 to control the release of the valve 1 which in turn will let the compressed air flow through the inflating nozzle 4 via said hose 3 once said valve 1 is released. Said inflating nozzle 4 is interconnected at its rear end with said valve 1 via said hose 3. The front end of said inflating nozzle 4 is provided with an inflating mouth 401. During the inflating operation, the projecting post disposed at the central of the valve of the tire will press against the valve 402 and open it, and then the compressed air will flow into the tire to be inflated. Nevertheless, the conventional inflating nozzle 4 has a simple function, inflating the tire only. During the periodic maintenance to the vehicle, the operator needs to use the compressed air to blow out the dust or scale accumulated to the parts. In light of this, it is readily to see the operator change the inflating nozzle with a blowing gun to blow out the dust. Afterward, the inflating nozzle will be installed again to inflate the tire. It really takes time. On the other hand, during the inflating operation, the operator shall hold and press the inflating nozzle against the valve of the tire. In case of over-inflation, the operator shall hold the inflating nozzle 4 in one hand, and then use a tip to press against the valve 404 of the releasing mouth 403 to release the air inside the tire. This is really not easy to handle.

SUMMARY OF THE INVENTION

It is the object of this invention to provide an inflating assembly which combines the functions of inflating the tire as well as blowing out the dust. Accordingly, the inconvenience encountered by the prior art wherein the inflating the tire and blowing out the dust shall be carried with separate nozzle and gun can be completely solved.

It is the object of this invention to provide an inflating assembly which inherits the functions of inflating the tire as well as blowing out the dust.

It is the object of this invention to provide an inflating assembly which is readily handy and can be handled with one hand by the operator for inflating as well as releasing the air.

It is still the object of this invention to provide an inflating assembly wherein the air flow on the blowing port can be adjusted.

In order to achieve the objects set forth, the inflating assembly made according to this present invention comprises a L-Shaped body, an inflating device, a retaining device and a blowing device. Said L-shaped body has a tubular threaded portion at front and side ends. A tubular extension is provided at rear end for interconnecting with a compressed air source through a hose. Said inflating device includes a cover, a washer and a valve. Said inflating device is mounted to said front portion of said L-shaped body by means of said cover. Accordingly, an inflating port is formed thereof. Said cover further includes a crescent slot thereof. Said retaining device includes a body, a releasing lever, a pin, a spring and a retaining plate. Said retaining device can be installed onto the side wall of the front portion of said L-shape body in such a manner that the free end of said retaining plate which is interconnected with said releasing lever is disposed within said crescent slot of said cover of said inflating device. By the operation of said releasing lever, the retaining device can be retained onto the valve of a tire. Said blowing device includes a tubular cover having threaded portion at both inner and outer walls. Said tubular cover can be used to attach a nozzle, a washer, a valve and a spring to the said front tubular extension of said L-shape body. Said blowing nozzle is provided with threaded portion at its inner peripheral which can engage with the inner threaded portion of said tubular cover. By rotation of said valve, the timing and volume of the compressed air for blowing out the dust can be adjusted and controlled.

According to one aspect of the present invention, the outer wall of said blowing nozzle is provided with patterns for readily holding and rotating by the operator.

According to one aspect of the present invention, said inflating device further includes a piston valve, an inflating nozzle and a handle. Said piston valve is attached to the side tubular extension of said L-shape extension by the threaded portion provided at the outer portion of said inflating nozzle. By rotating the handle, the piston valve can be driven to rotate and switch the direction of those two sets of channels. Accordingly, the compressed air flow can be directed to said inflating device for inflating the tire or the blowing device for blowing out the dust.

According to one aspect of the present invention, said piston valve of said inflating device is disposed with two sets of channels. One of said two channels is disposed traverse to direct the compressed air to the front inflating nozzle. The inlet of the other channel is offset from the first one with an preset angle. The second channel is turned 90 degrees at the central portion and have its outlet at outside portion. By this arrangement, the compressed air can be directed to the blowing gun via the second channel.

According to another aspect of the invention, said piston valve has a ball configuration.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

3

Figure 5:
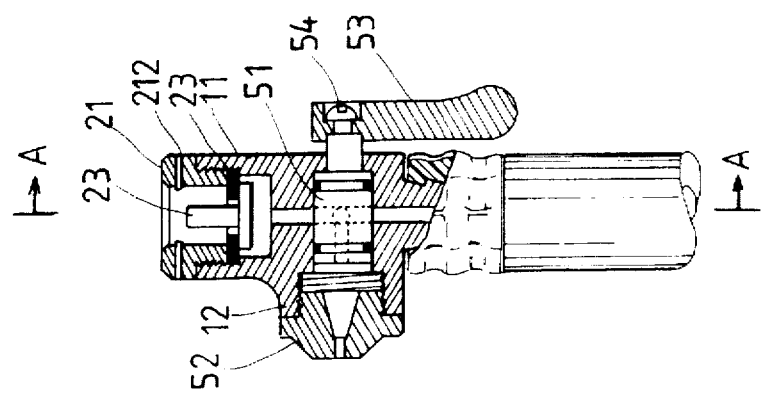
Figure 4:
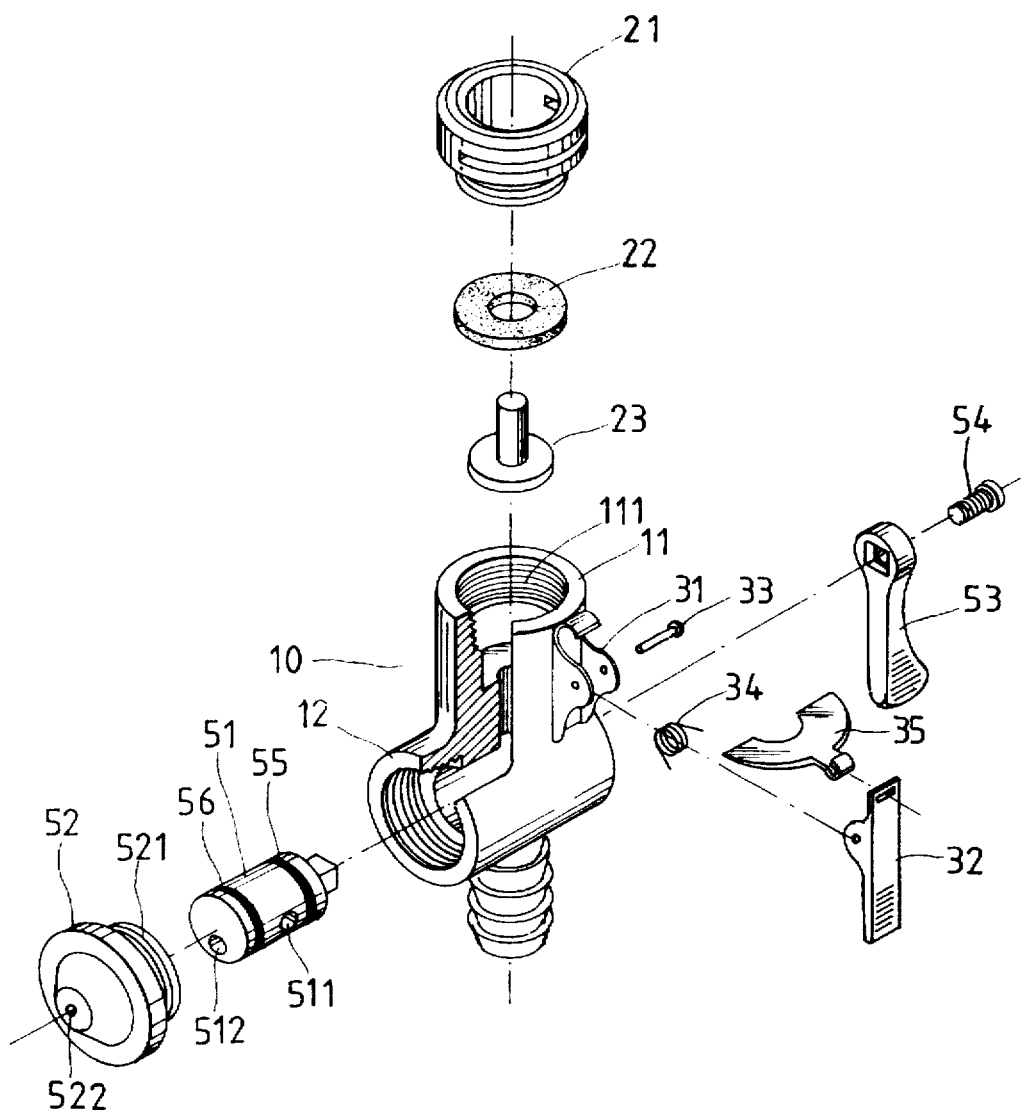
Figure 9:
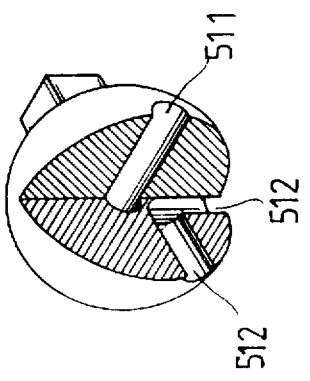
Figure 8:
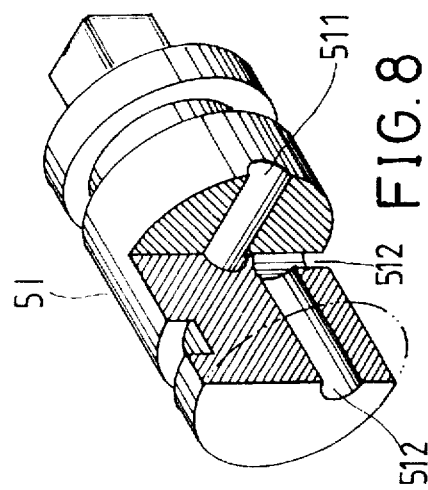
Figure 6:
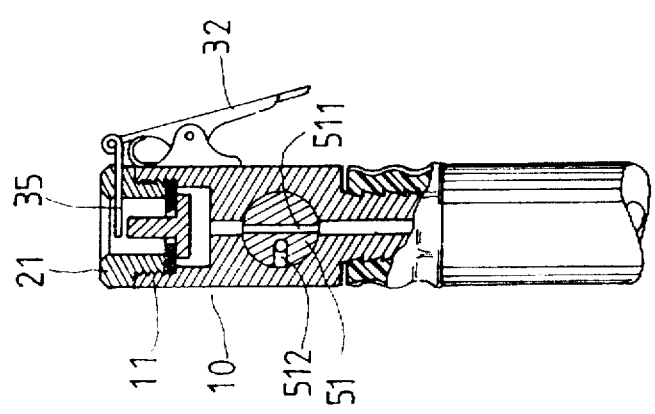
Figure 7:
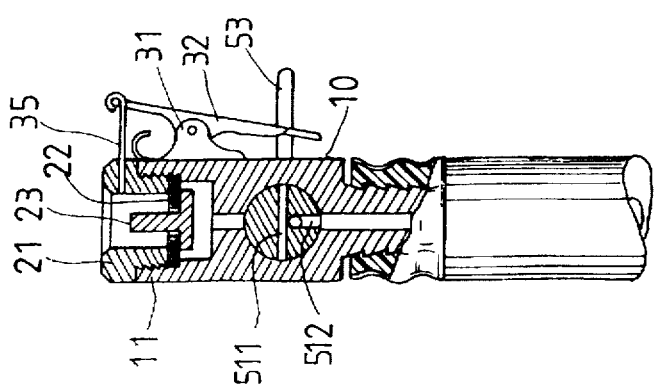
Figure 10:
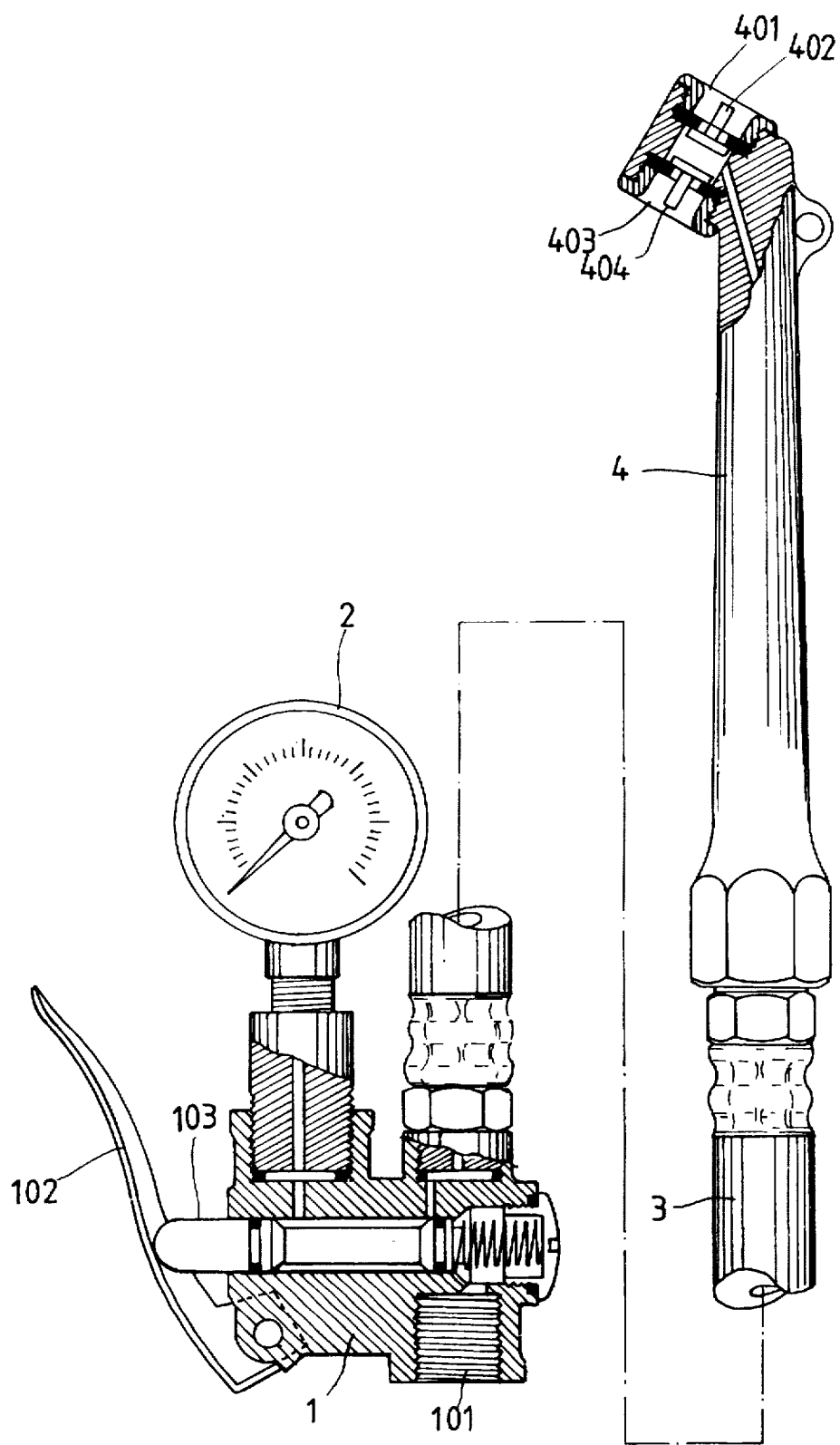

FIG. 4 is an exploded perspective view of the second embodiment of the inflating assembly made according to the present invention;

FIG. 5 is a cross sectional view of the second embodiment of the inflating assembly made according to the present invention;

FIG. 6 is a cross sectional view taking from A—A line of FIG. 5;

FIG. 7 is a cross sectional view of the piston valve shown in FIG. 6 which has been turned through 90 degrees;

FIG. 8 is a perspective view of the piston valve of the second embodiment made according to the present invention;

FIG. 9 is a perspective view of the second embodiment of the piston valve made according to the present invention; and FIG. 10 is a perspective view of the conventional inflating nozzle.

DESCRIPTION OF THE PREFERRED EMBODIMENT

Figure 1:
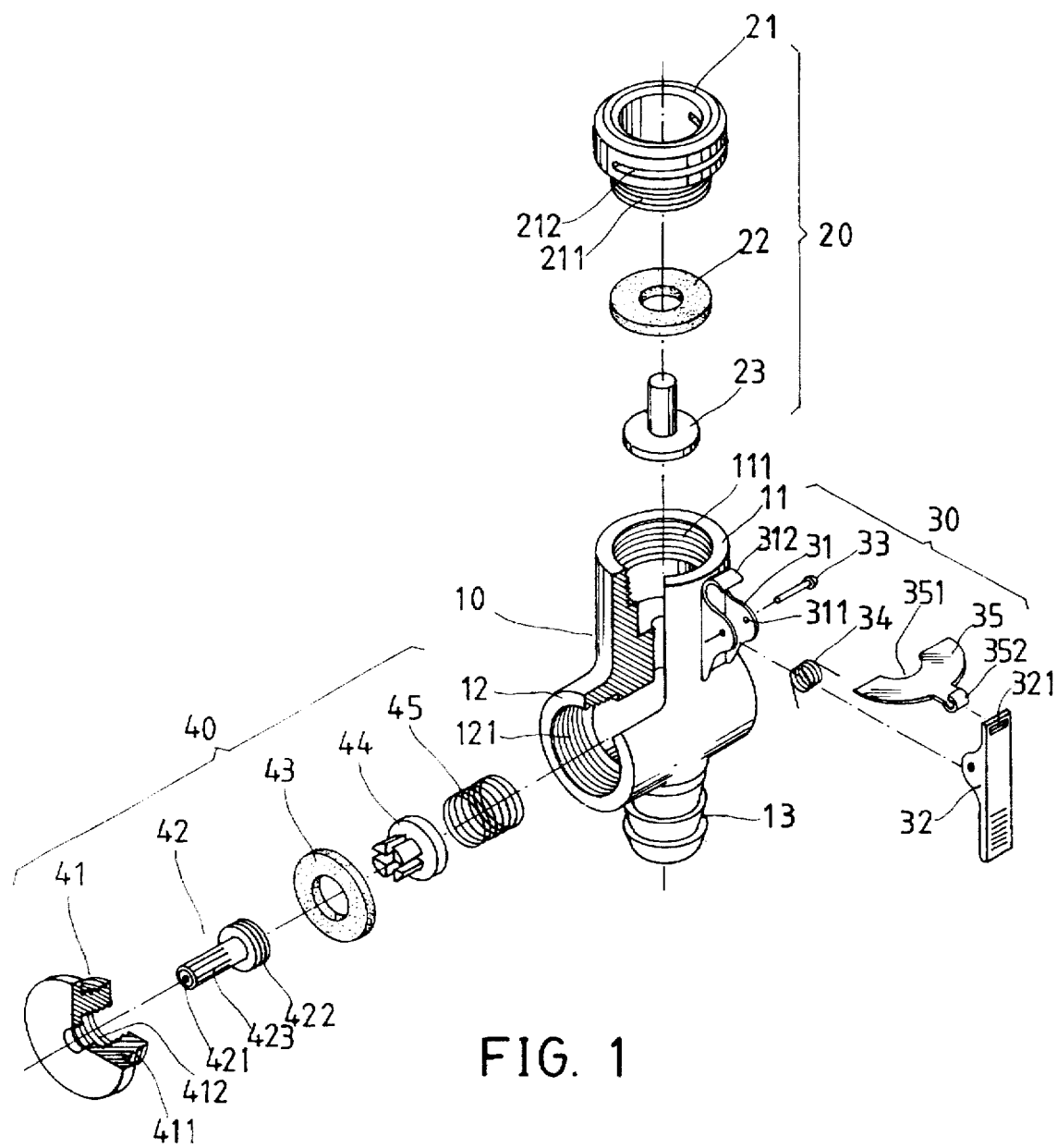
FIG. 1 is an exploded perspective view of the preferred embodiment of the inflating assembly made according to the present invention.
Figure 3:
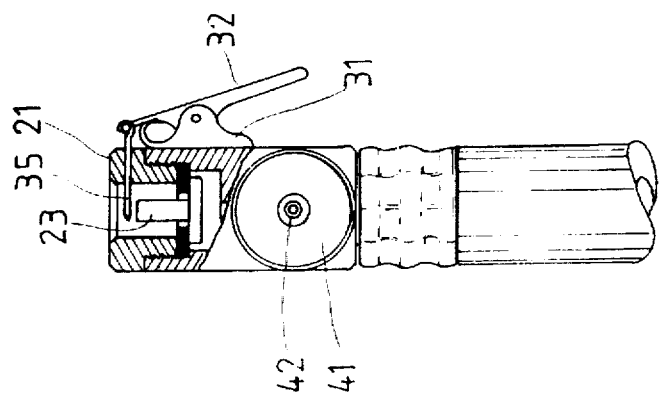
FIG. 3 is a side and partial elevational view of the preferred embodiment of the inflating assembly made according to the present invention.
Figure 2:
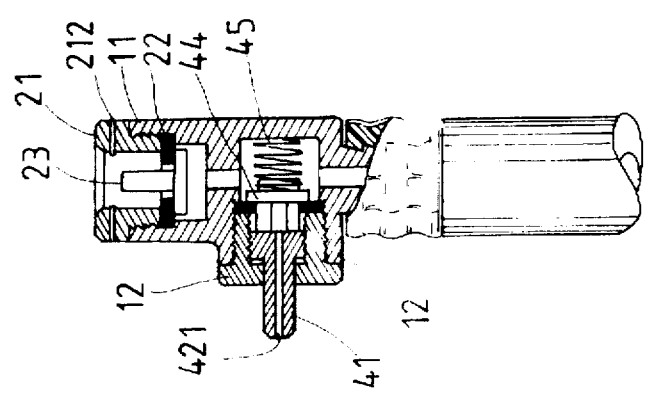
FIG. 2 is a cross sectional view of the preferred embodiment of the inflating assembly made according to the present invention.

Referring to FIGS. 1, 2 and 3, the inflating assembly made according to this present invention generally comprises a L-Shaped body 10, an inflating device 20, a retaining device 30 and a blowing device 40. Said L-shaped body 10 has a tubular threaded portion 111, 121 at front and side ends 11, 12. A tubular extension 13 is provided at rear end for interconnecting with a compressed air source through a hose.

Said inflating device 20 includes a cover 21, a washer 22 and a valve 23. Said inflating device 20 is mounted to said front threaded portion 111 of said L-shaped body by means of a threaded portion 211 of said cover 21. Accordingly, an inflating port is formed thereof. When the valve stem of the valve of a tire is received within said inflating port, the valve post of the valve will press against the valve 23 to release the compressed air to flow in the valve of the tire. Said cover 21 further includes a crescent slot 212 thereof.

Said retaining device 30 includes a body 31, a releasing lever 32, a pin 33, a spring 34 and a retaining plate 35. The bottom of said body 31 is provided with holes 311 for said pin 33 passes through. Then said releasing lever 32 and said spring 34 can be assembled together. The front portion of said body 31 is provided with a curved tab 312 to position of said releasing lever 32. Said retaining plate 35 is provided with a semi-circular cutout 351 which can be disposed within said crescent slot 212 of said cover 21. The outer portion of said retaining plate 35 is bent to a hook which can be received by the hole 321 of said retaining plate 32. By the actuation of said retaining lever 32, said retaining plate 35 can be used to lock and release the valve stem of the valve of a tire, referring to FIGS. 6 and 7 for the movement of said releasing lever 32 and said retaining plate 35.

Said blowing device 40 includes a tubular cover 41, a blowing nozzle 42, a washer 43, a valve 44 and a spring. By the outer threaded portion 411 of said tubular cover 41, said tubular cover 41 can be used to attach said blowing nozzle 42, said washer 43, said valve 44 and said spring 45 into said L-shape body 10. Said blowing nozzle 42 is provided with a through hole 421 at the central portion. The inner wall of said blowing nozzle 42 is provided with threaded portion 422 and the outer wall is provided with patterns 423. By the engagement between said threaded portions 422 and 412, said blowing nozzle 42 can be attached to said tubular cover 41 while rotating said blowing nozzle 42 thereof. By the

4 engagement between said valve 44 and said blowing nozzle, the volume of the compressed air flow through said blowing nozzle 42 can be adjusted and controlled.

Referring to FIGS. 4, 5 and 6, it is a second embodiment of said blowing device. The blowing device includes a piston valve 51, a blowing nozzle 52 and a handle 53. One end of said piston valve 51 passes through said L-shape body 10 and said handle 53 is mounted by means of a bolt 54 thereof. Said piston valve 51 includes a pair of sealing rings 55, 56 and a first and second channels 511, 512, referring to FIG. 8. Said first channel 511 is disposed traverse and said second channel 512 is disposed perpendicularly to said first channel 511. Said second channel 512 has a turn of 90 degrees at the central portion and extend outward and axially. Said blowing nozzle 52 is attached to said L-shape body 10 by means of the threaded portion 521. An exit aperture 522 is disposed thereof for directing the compressed air.

Referring to FIG. 6, when said piston valve 51 is rotated in such a manner that said channel 511 is parallel with said tube 11 of said L-shape body 10. By this arrangement, the compressed air flows through said inflating nozzle to inflate a tire. Referring to FIG. 7, said handle 53 is rotated through 90 degrees and is perpendicular to said tube 11 of said L-shape body 10. By this arrangement, the compressed air will not flow into said inflating nozzle while flows into said blowing nozzle 52 through said second channel 512. As shown in FIG. 9, said piston valve 51 can be configured as a ball type.

By the unique design of the present invention, the inflating assembly made according to this invention is featured with inflating and blowing functions. On the other hand, the flow rate can be controlled to meet the requirements. Furthermore, a retaining plate is provided to retain the inflating nozzle onto the valve stem. Accordingly, the operator can operate it with one hand. In case of over-pressure, the compressed air can be readily released by said blowing nozzle 42 as shown in FIG. 1 and said handle 53 shown in FIG. 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An inflating assembly comprising generally a L-shaped body, an inflating device, a retaining device and a blowing device, said L-shaped body having a tubular threaded portion at front and side ends, a tubular extension being provided at rear end for interconnection with a compressed air source through a hose;

said inflating device including a cover, a washer and a valve, said inflating device being mounted to said front end of said L-shaped body by means of said cover to form an inflating port thereof, said cover further including a crescent slot therein;

said retaining device including a body, a releasing lever, a pin, a spring and a retaining plate, said retaining device being installable onto a side wall of the front end of said L-shaped body such that a free end of said retaining plate which is interconnected with said releasing lever is disposed within said crescent slot of said cover of said inflating device, by the operation of said releasing lever, the retaining device being retained on a tire valve; and said blowing device including a tubular cover having a threaded portion at both inner and outer walls, said tubular cover retaining a nozzle, a washer, a valve and a spring on the side end of said L-shaped body, said nozzle being provided with a threaded portion on its inner periphery which engages with the inner threaded portion of said tubular cover, by rotation of said nozzle, the timing and volume of the compressed air for blowing away dust can be adjusted and controlled.

2. The inflating assembly as recited in claim 1, wherein said nozzle is provided with patterns for readily holding and rotating the nozzle by an operator.

* * * * *